Dec. 1, 1959  D. R. ELLIOTT ET AL  2,914,940
METHOD AND APPARATUS FOR DETERMINING AND MEASURING THUMP
Filed May 28, 1956

INVENTOR.
DANIEL R. ELLIOTT
BY KEITH A. FERGUSON
KENNETH A. REID

James J. Long
AGENT.

United States Patent Office 2,914,940
Patented Dec. 1, 1959

2,914,940

METHOD AND APPARATUS FOR DETERMINING AND MEASURING THUMP

Daniel R. Elliott, Grosse Pointe Woods, Keith A. Ferguson, Detroit, and Kenneth A. Reid, Grosse Pointe Woods, Mich., assignors to United States Rubber Company, New York, N.Y., a corporation of New Jersey Application May 28, 1956, Serial No. 587,632

5 Claims. (Cl. 73—146)

This invention relates to a method and apparatus for detecting and measuring what is known as "thump" in pneumatic tires for vehicles.

"Thump" is a term used in the tire industry to denote a periodic noise or vibration emanating from a tire on each revolution thereof during operation of the vehicle on which it is mounted.

With the advent of the modern automobile with its sensitive wheel suspension system and relatively quiet operation, the problem of "thump" has become rather serious. The problem is aggravated by the fact that tires which are satisfactory as regards "thump" when used on one automobile may not necessarily be satisfactory in this respect when used on another automobile, whether of the same or different make or type.

While it is believed that "thump" is due to non-uniformity of a tire as to weight distribution, flexibility of the components, etc., tire manufacturers have not been able, because of the many variables involved, to eliminate "thump" from all tires when used on all types of vehicles. It has been the practice, therefore, for tire manufacturers to make adjustments, i.e., provide replacement tires for those tires exhibiting objectionable "thump" on a particular vehicle. It is, however, both time consuming and difficult to isolate the offending tire or tires on a particular vehicle, and in some instances such has been impossible. Consequently, adjustments have been very high, and have contained a large number of tires which in fact were satisfactory as regards "thump."

The object of the present invention is to provide a simple, inexpensive method and apparatus by which comparatively unskilled operators can quickly and efficiently detect and measure "thump" in vehicle tires while the tires are mounted on the vehicle.

To this end, we affirm that there is a correlation between "thump" and changes in rolling resistance of a rolling tire, and both the method and apparatus of the present invention rely on this principle. In accordance with the invention, a freely rotatable roller journaled in bearing means carried by cantilever leaf spring means at the free end of the latter is placed in rolling contact with the tread of the tire to be tested, and the tire, which is pressed against the roller under a predetermined load, is then rotated. Suitable sensing or indicating means are employed to detect or measure abrupt and usually periodically recurring changes in the deflection of the cantilever leaf spring means. This measure of the change in deflection we have unexpectedly found to be proportional to the "thump" in the tire. If there is no change in deflection or the change is slight, then the tire is comparatively free of "thump." If the change in deflection is large, then there is indicated a substantial "thump," requiring a replacement of the tire.

The apparatus of the invention, thus, broadly includes a freely rotatable roller, roller-carrying means arranged for opposing and for deflection or displacement by the force applied to the roller by the tire in a direction tangential to the tread, and means for measuring abrupt or sudden changes of the deflection. In the preferred form of the invention, the means for carrying the roller constitutes a leaf spring, and the means for measuring the changes in deflection includes electro-mechanical transducer means responsive to the deflection of the spring.

Other objects and advantages of the present invention will become apparent from the following description when read in conjunction with the accompanying drawing wherein.

Figure 1:
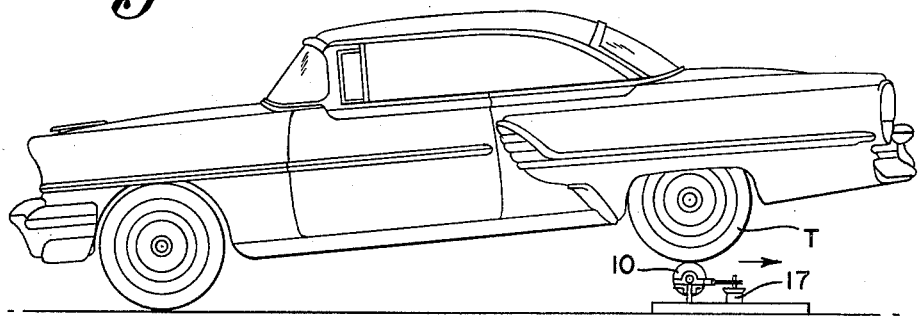
Fig. 1 is an elevational view showing an apparatus of the invention being used to detect and measure "thump" in a tire while the tire is mounted on a vehicle.
Figure 2:
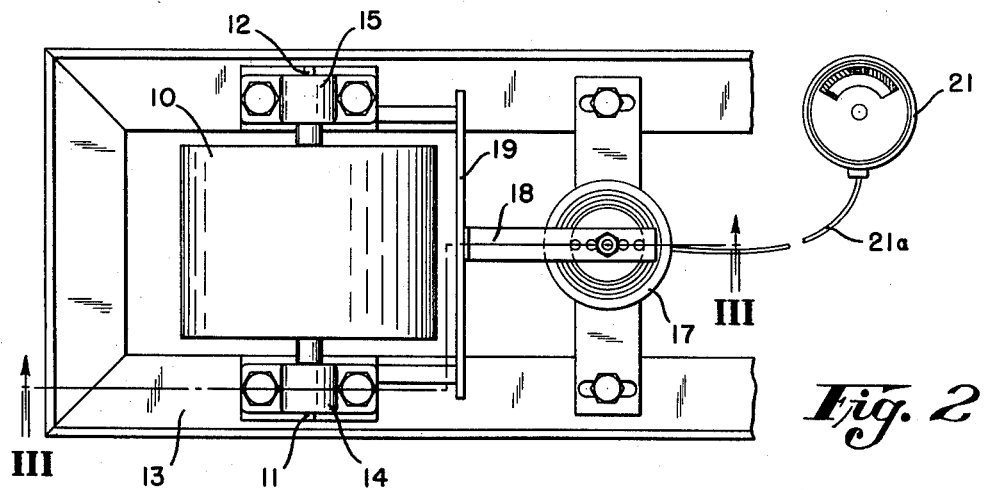
Fig. 2 is a plan view of the apparatus on an enlarged scale.
Figure 3:
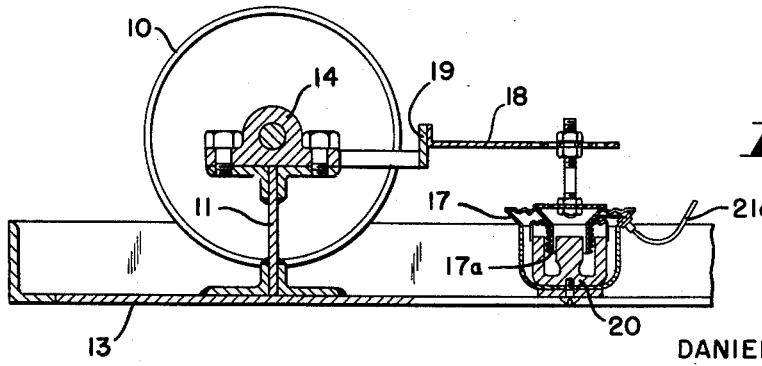
Fig. 3 is a sectional view of the apparatus taken on the line III—III of Fig. 2.

Referring to the drawing there is shown by way of illustration, one embodiment of the apparatus of the invention in which a roller 10 is pressed against the tread of a tire T to be tested. The means for supporting the roller 10 for rolling contact with the tread of the rotating tire T consists of two cantilever mounted leaf springs 11 and 12. The springs 11 and 12 are secured at one of their ends to a base frame 13 and at their other ends to bearings 14 and 15, respectively, in which the roller 10 is mounted for free rotation. It will be apparent therefore, that by means of this spring mounting, the roller may deflect laterally under the force imposed thereon by the tread of the rotating tire T in a direction tangential to the tread of the tire, to an extent determined by the tire's rolling resistance. The normal deflection of the springs 11 and 12 will be proportional to the normal rolling resistance, and the changes in deflection will be proportional to the changes in the rolling resistance. Thus, any change in the deflection of the springs 11 and 12 will be indicative of the presence, and also proportional to the magnitude of, the change in rolling resistance of the tire.

The means for detecting and measuring this change in deflection may be of numerous forms, either optical (i.e., moving mirrors or light source), electrical, mechanical, or combinations thereof. In the drawing, there is shown, by way of illustration, the use of a generator or transducer 17. The generator 17 is attached to the base frame 13 and has a movable coil 17a which is adjustably attached to the free end of an arm 18, which in turn is secured to and extends from the center of a tie bar 19 which is secured at its ends to the springs 11 and 12. The bar thus serves to average out or compensate for minor differences in the operating characteristics of the two cantilever leaf springs. The movement of the coil 17a in the magnetic field of a permanent magnet 20, which serves as a core results in an output proportional to the rate of change in displacement of the arm 18, and therefore the roller 10. The output of the coil is indicated on and measured by an A.C. meter 21 which is connected to the coil by wires 21a. This output of the coil as read on the A.C. meter will be proportional to the rate of change in the rolling resistance of the tire and we have found that such output provides a reliable and accurate indication and quantitative measure of "thump" of the tire.

The sensitivity of the apparatus may be varied by adjusting the point of connection of the coil 17a to the arm 18 to change thereby the effective length of the arm 18.

The apparatus may be constructed conveniently and inexpensively, since the generator 17 may consist simply of a conventional loudspeaker unit comprising a movable voice coil and a permanent field magnet.

The apparatus may be utilized to determine "thump" in a tire when the tire is mounted on a driven spindle or part of the vehicle or when mounted on the vehicle as shown in Fig. 1. In the latter case, the wheel of the vehicle is jacked up, the apparatus is placed under the wheel and the vehicle lowered to press the tread of the tire against the roller under load. The tire is then rotated by operation of the engine, assuming the tire is mounted on a driving wheel, or the tire is rotated by a separate power source.

From the above description it can be seen that there is provided a simple, inexpensive, but very effective method and apparatus for determining "thump" in the pneumatic vehicle tire.

In operation of the apparatus, the rolling resistance of the tire will cause a certain tilt or displacement of the springs, and, consequently, cause a displacement of the generator coil. This tilt or displacement will fluctuate to a greater or lesser extent in proportion to whether the tire has considerable "thump" or little or no "thump." It is important to note that we measure neither the total nor average amounts of the tilt or displacement, but instead we measure the rate of fluctuation in the tilt or displacement, that is, we measure vibrations or rate of change in the force resisting rotation of the tire. Rapid fluctuation in the deflection of the springs are of course transferred mechanically to the coil of the generator. The resulting vibration of the generator coil produces an output in the form of an alternating current. The magnitude of such current of course depends on the velocity or intensity of the vibrations. Hence, the A.C. meter is ultimately indicating the intensity of variations in the rolling resistance of the tire as the tire revolves. A measurement of this kind has been found in actual practice, to be unusually reliable and effective in classifying tires according to their tendency to produce "thump." With this apparatus the particular tire or tires responsible for "thump" on a given vehicle can be located quickly, and, after replacement of such tires, a quick re-check can be made conveniently to make certain that the "thump" has been alleviated.

Having thus described our invention, what we claim and desire to protect by Letters Patent is:

1. Apparatus for determining thump in a pneumatic tire during rotation of said tire comprising a freely rotatable roller adapted to be pressed against the tread of the tire, means for resisting and detecting tangential displacement of said roller, supporting means for said roller for connection to said resisting and detecting means, and means coupled to said resisting and detecting means and responsive to the detected tangential displacement for indicating changes in said displacement.

2. Apparatus for determining thump in pneumatic tires, comprising a rigid base, a pair of parallel cantilever leaf springs each fixedly mounted at one end thereof on said base and both projecting from the latter in a common plane for deflection in a direction substantially transverse to said plane, a pair of bearing means carried, respectively, by said cantilever leaf spring at the other ends thereof and movable therewith substantially in said direction, a roller journaled in said bearing means for rotation about an axis disposed in said plane and extending transversely to said direction of deflection of said cantilever leaf springs, said roller being provided with a smooth outer surface adapted to be placed in rolling contact with the tread of a tire when pressed thereagainst and the axis of rotation of which is disposed in said plane and substantially parallel to said axis of rotation of said roller, a rigid bar connected to both said bearing means for movement therewith, and sensing means operatively connected to said bar substantially centrally of the latter and responsive to fluctuating movements of said bar resulting from relatively abrupt changes in deflection of said cantilever leaf springs, whereby corresponding abrupt changes in the output of said sensing means serve as an index of the presence and magnitude of thump in said tire.

3. Apparatus according to claim 2, further comprising an arm rigidly connected to and extending from the center of said bar, said sensing means comprising a coil-and-magnet type transducer and an indicator responsive to electric current induced in said coil upon relative movement between the latter and said magnet, said transducer being connected to said arm at a part of the latter remote from said bar, and means for adjusting the connection between said arm and said transducer, to thereby vary the distance from said bar to said connection and thus the sensitivity of said sensing means.

4. Apparatus for determining thump in pneumatic tires, comprising cantilever leaf spring means fixed in position at one end and free at the other end for deflection in a direction substantially transverse to the plane of said cantilever leaf spring means, bearing means carried by said cantilever leaf spring means at said free end thereof and movable therewith substantially in said direction, a roller supported by said bearing means for free rotation about an axis extending substantially transversely to said direction, said roller being provided with an outer surface adapted to be placed in rolling contact with the tread of a tire when pressed thereagainst and the axis of rotation of which is coplanar with both said cantilever leaf spring means and said axis of rotation of said roller, and sensing means responsive to relatively abrupt changes in deflection of said cantilever leaf spring means, whereby corresponding abrupt changes in the output of said sensing means serve as an index of the presence and magnitude of thump in said tire.

5. A method for determining thump in a pneumatic tire during rotation of the tire comprising, pressing a freely rotatable roller against the tread of the tire, allowing the roller to be displaced tangentially of the tread while resisting tangential displacement of said roller, and sensing changes in displacement of said roller tangentially of said tread.

References Cited in the file of this patent

UNITED STATES PATENTS

| | | |
|---|---|---|
| 2,144,010 | Bennett | Jan. 17, 1939 |
| 2,471,423 | Gisser | May 31, 1949 |
| 2,695,520 | Karsai | Nov. 30, 1954 |
| 2,722,824 | Jensen et al. | Nov. 8, 1955 |
| 2,774,241 | Bennett | Dec. 18, 1956 |